(12) United States Patent
Meder

(10) Patent No.: US 11,063,281 B2
(45) Date of Patent: Jul. 13, 2021

(54) METHOD AND DEVICE FOR OPERATING FUEL CELLS WITH ARTIFICIAL AIR

(71) Applicant: PROTON MOTOR FUEL CELL GMBH, Puchheim (DE)

(72) Inventor: Quirin Meder, Schondorf am Ammersee (DE)

( * ) Notice: Subject to any disclaimer, the term of this patent is extended or adjusted under 35 U.S.C. 154(b) by 191 days.

(21) Appl. No.: 15/566,410

(22) PCT Filed: Apr. 13, 2016

(86) PCT No.: PCT/EP2016/000606
§ 371 (c)(1),
(2) Date: Oct. 13, 2017

(87) PCT Pub. No.: WO2016/165824
PCT Pub. Date: Oct. 20, 2016

(65) Prior Publication Data
US 2018/0097246 A1 Apr. 5, 2018

(30) Foreign Application Priority Data
Apr. 14, 2015 (DE) .................... 10 2015 004 827.9

(51) Int. Cl.
*H01M 8/04089* (2016.01)
*H01M 8/04225* (2016.01)
*H01M 8/04223* (2016.01)
*H01M 8/04791* (2016.01)
(Continued)

(52) U.S. Cl.
CPC ..... *H01M 8/04798* (2013.01); *H01M 8/0432* (2013.01); *H01M 8/0438* (2013.01);
(Continued)

(58) Field of Classification Search
CPC ......... H01M 8/04798; H01M 8/04089; H01M 8/04097; H01M 8/04156; H01M 8/04164;
(Continued)

(56) References Cited

U.S. PATENT DOCUMENTS

| 9,577,272 B2 | 2/2017 | O'Neill et al. |
| 2003/0077493 A1 | 4/2003 | Colborn et al. |

(Continued)

FOREIGN PATENT DOCUMENTS

| DE | 102014112745 A1 | 3/2015 |
| DE | 10201410112745 A1 | 3/2015 |

(Continued)

OTHER PUBLICATIONS

International Search Report and Written Opinion issued in PCT/EP2016/000606, dated Jun. 20, 2016, 5 pages.
(Continued)

*Primary Examiner* — Jonathan G Jelsma
(74) *Attorney, Agent, or Firm* — Arc IP Law, PC; Joseph J. Mayo

(57) ABSTRACT

The invention relates to a fuel cell system (1) suitable for operation with a cathode operating gas containing oxygen and inert gas and an anode operating gas containing hydrogen and inert gas; an appliance system operated by means of the fuel cell system (1); and a method for operating the fuel cell system (1). In the method according to the invention, the single components of the operating gases are stored separately, and mixed to the required portions during operation of the fuel cell system, thereby constantly recirculating the inert portion of the operating gases. During operation of the fuel cell system, gases are neither taken in from the environment nor released into the environment nor are fuel cell exhaust gases stored in the fuel cell system or the appliance system. In an alternative variation, only the anode operating gas is mixed and recirculated, while the cathode operating gas and the cathode exhaust gas are taken from the environment and released into the environment, respectively.

17 Claims, 3 Drawing Sheets

Figure 1:
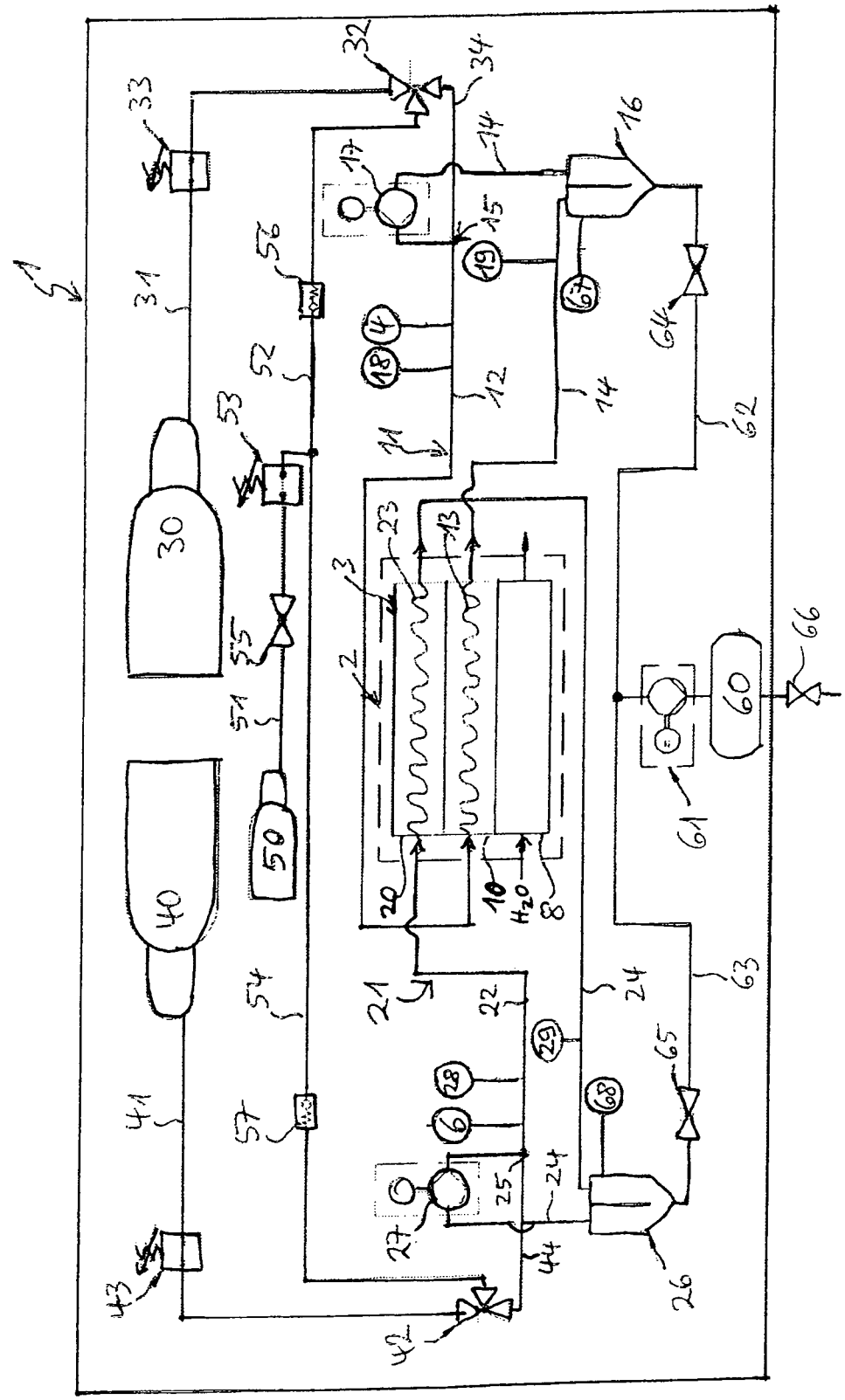

(51) Int. Cl.
  *H01M 8/04082* (2016.01)
  *H01M 8/0444* (2016.01)
  *H01M 8/04119* (2016.01)
  *H01M 8/0432* (2016.01)
  *H01M 8/0438* (2016.01)
  *H01M 8/04291* (2016.01)
  *H01M 8/10* (2016.01)
  *H01M 8/1018* (2016.01)

(52) U.S. Cl.
  CPC ... *H01M 8/04089* (2013.01); *H01M 8/04097* (2013.01); *H01M 8/04156* (2013.01); *H01M 8/04164* (2013.01); *H01M 8/04201* (2013.01); *H01M 8/04223* (2013.01); *H01M 8/04225* (2016.02); *H01M 8/04291* (2013.01); *H01M 8/04328* (2013.01); *H01M 8/04335* (2013.01); *H01M 8/04388* (2013.01); *H01M 8/04395* (2013.01); *H01M 8/04447* (2013.01); *H01M 8/04455* (2013.01); *H01M 8/04791* (2013.01); *H01M 8/10* (2013.01); *H01M 2008/1095* (2013.01); *H01M 2250/20* (2013.01); *Y02T 90/40* (2013.01)

(58) Field of Classification Search
  CPC ......... H01M 8/04201; H01M 8/04225; H01M 8/04223
  See application file for complete search history.

(56) References Cited

U.S. PATENT DOCUMENTS

| | | |
|---|---|---|
| 2005/0142399 A1 | 6/2005 | Kulp et al. |
| 2007/0065711 A1 | 3/2007 | Gopal |
| 2007/0184319 A1* | 8/2007 | Limbeck .......... H01M 8/04104 429/446 |
| 2013/0344406 A1* | 12/2013 | Paganelli .......... H01M 8/04097 429/414 |

FOREIGN PATENT DOCUMENTS

| | | |
|---|---|---|
| JP | 2004158229 A | 6/2004 |
| JP | 2007141475 | 6/2007 |
| JP | 2007517372 | 6/2007 |
| JP | 2007273276 A | 10/2007 |
| JP | 2009211837 | 9/2009 |
| RU | 2267834 A | 1/2006 |
| WO | 2007128007 A1 | 11/2007 |
| WO | 2010075602 A1 | 7/2010 |

OTHER PUBLICATIONS

Office Action issued in JP2017-553366 (English Translation), drafted Jun. 18, 2019; 9 pages.
Federal Institute of Industrial Property Search Report issued in PCT/EP2016/000606, dated Jul. 27, 2018, 2 pages (Russian).
Federal Institute of Industrial Property Search Report issued in PCT/EP2016/000606, dated Jul. 27, 2018, 2 pages (English Translation).
Federal Service for Intellectual Property Decision to Grant issued in PCT/EP2016/000606, dated Jul. 30, 2018, 10 pages (Russian).
Federal Service for Intellectual Property Decision to Grant issued in PCT/EP2016/000606, dated Jul. 30, 2018, 10 pages (English Translation).

* cited by examiner

METHOD AND DEVICE FOR OPERATING FUEL CELLS WITH ARTIFICIAL AIR

The subject matter of the present invention is a method for operating a fuel cell system with operating gases containing inert gas components; a fuel cell system operable with operating gases containing inert gas components; and an appliance system comprising such a fuel cell system. In this method, fuel cell system and appliance system, fuel cell exhaust gases are neither released into the environment nor stored during fuel cell operation. In an alternative embodiment, at least anode exhaust gas is neither released into the environment nor stored during fuel cell operation.

In fuel cells, electrical energy is generated from chemical energy by inverting water electrolysis. The single cell continuously delivers current by continuously supplying the oxidizing substance (hydrogen) and the oxidant (oxygen) and continuously discharging oxidation products. In principle, different types of fuel cells, their compositions and modes of operation are known.

Fuel cells are suitable for generating current for any appliances. They provide the required power in an environmentally-friendly, reliable way and with a high degree of efficiency.

One of the reaction gases, oxygen, is usually supplied in form of air, which is, in the simplest case, taken in from the environment. After the reaction, potentially remaining oxygen or rather the oxygen-depleted air, including product water, is released back into the environment. The other reaction gas, hydrogen, must be taken from a reservoir, such as a compressed gas cylinder. After the reaction, unconsumed hydrogen cannot simply be released back into the environment. Therefore, the supply of hydrogen to a fuel cell must either be limited to the amount consumed at the anode—i.e. the fuel cell is, on the anode side, operated in dead-end mode—or the anode exhaust gas is recirculated, and/or the unconsumed hydrogen in the anode exhaust gas is used for another purpose, for example for operating a burner.

Some application fields of fuel cells require there be no direct contact to the environment during fuel cell operation, for example an application in a closed system, such as a submarine vehicle. For such an application, the same applies to the reaction gas oxygen as otherwise applies to hydrogen: oxygen must be supplied from a reservoir, such as a compressed gas cylinder, and potentially non-consumed oxygen cannot be released back into the environment after the reaction. Any product water resulting from the reaction must also remain in the closed system.

Problems arise if fuel cells in a closed system are not operated with pure hydrogen and pure oxygen, but if at least one of the fed-in gases also contains inert portions, i.e. portions that do not abreact in the fuel cells. This is typically the case on the cathode side. If oxygen was used in pure form or in a high concentration, the cathode catalyst would rapidly oxidize, which would result in degradation and eventually destroy the catalyst and disrupt the fuel call reaction, it is recommended to use oxygen in a concentration of no more than 50 volume percent.

For this reason, oxygen in fuel cells is usually used in form of air as operating gas. Natural air contains just under 21 volume percent oxygen, approximately 78 volume percent nitrogen, and aside from that mainly argon, carbon dioxide and very small amounts of various other noble gases.

The drawback of using air or, in general, using gases that contain inert components is that these inert components leave the fuel cells unchanged, such that during fuel cell operation in a closed system, large amounts of exhaust gases accumulate, which must be collected somewhere, if applicable in compressed or liquefied form. Providing exhaust gas collection containers of sufficient size is, however, not feasible and compressing or even liquefying the exhaust gases would waste a significant part of the generated fuel cell energy.

If a fuel cell were operated in a closed system, for example with natural air from a compressed gas cylinder, at least 79 volume percent of the supplied gas (at least the inert portions) would not abreact. The exhaust gas could not be recirculated either, even if it still contained a significant portion of non-abreacted oxygen, because in this manner, with increasing operation time, more inert gases would gradually be supplied to the fuel cell. The fuel cell performance would drop and the fuel cell reaction would at some point come to a stop due to an increasing enrichment of inert gases in the gas circuit.

To date, it was not possible to operate fuel cells with operating gases containing inert portions, such as air, in closed systems, as too much storage space would be required for accommodating the inert fuel cell exhaust gases under the temperature and pressure conditions of the system and/or too much energy would be required for compressing or liquefying the inert exhaust gases (without completely solving the space issue).

An object of the present invention is therefore to allow for operating fuel cells with operating gases containing inert portions, such as air, in closed appliance systems, especially in closed appliance, systems with limited space, such as submarine vehicles.

An object of the present invention is, in particular, to provide a method and a device for operating fuel cells in a closed appliance system, in particular in a closed appliance system with limited space, such as a submarine vehicle, wherein an operating gas containing inert portions, such as air, is supplied to the fuel cells.

Another object of the present invention is to provide a fuel cell operated appliance system, such as a vehicle, that uses an operating gas containing inert gas components, such as air, for operating the fuel cells without releasing fuel cell exhaust gas into the environment during fuel cell operation and without having means for storing the fuel cell exhaust gas.

Another object of the present invention is to provide a method, a device and an appliance system in which ambient air is used as cathode operating gas and is, after the fuel cell reaction, released into the environment as cathode exhaust gas, while anode exhaust gas is neither released into the environment during fuel cell operation, nor is it stored.

The objects are achieved by the fuel cell system, the appliance system and the method for operating a fuel cell system, each having the features as specified in the independent claims. Embodiments of the invention are specified in the respective dependent claims.

The fuel cell system according to the invention and the appliance system according to the invention are "closed compact systems". They are closed systems in that they neither take in matter from the environment nor release matter into the environment during their operation, and they are compact systems in that they do not generate exhaust gas (in terms of "gas to be discharged") and therefore do not have reservoirs for storing exhaust gas, in gaseous or liquefied form. This makes it possible to significantly save space in appliance systems with limited space. According to the invention, this is achieved by mixing the fuel cell operating gases, each containing, in addition to the reaction gases oxygen and hydrogen, also inert gas components, from the respective components no earlier than during operation of the fuel cell system and by recirculating the fuel cell exhaust gases containing inert and, possibly, also non-consumed reaction gases. By continuously supplementing the consumed reaction gases, operating gases, which can be supplied to the fuel cells, are continuously re-generated. The fuel cell system according to the invention can therefore run with a very small amount of inert gas, as the amount of inert gas introduced at the beginning of the fuel cell operation is continuously circulated. This prevents the generation of non-usable exhaust gas, which would have to be stored or discharged. The only reaction product that is generated is water, which can be stored in liquid form without any specific treatment for being liquefied and therefore requires very little space.

In one variant of the fuel cell system according to the invention, only the anode exhaust gas is recirculated, while the cathode exhaust gas is released into the environment.

In the following, the terms used for describing the present invention are explained:

The anode operating gas and the cathode operating gas are the gases supplied to the anode and the cathode of a fuel cell, respectively. The operating gas contains the reaction gas and inert gas portions (inert gas) and potentially gaseous water.

The anode reaction gas and the cathode reaction gas are the components of the operating gas involved in the fuel cell reaction, in the present invention, the anode reaction gas is hydrogen and the cathode reaction gas is oxygen.

The inert gas component (inert gas) is, apart from potentially contained gaseous water, the component of the anode operating gas and the cathode operating gas, respectively, that is not involved in the fuel cell reaction, i.e. it does not abreact in the fuel cell and exits the fuel cell as part of the fuel cell exhaust gas.

The anode exhaust gas and the cathode exhaust gas are the matter that leaves the fuel cells after the operating gases have reacted. The fuel cell exhaust gas may also contain liquid components, such as reaction water.

A fuel cell arrangement comprises one or more fuel cells, which may form one or more fuel cell stacks.

A fuel cell system is a fuel cell arrangement, including the components required for operating the fuel cells, such as gas reservoirs, pipes, pumps, valves, etc.

An appliance system is a stationary or mobile apparatus, such as a vehicle which comprises a fuel cell system and which is operated by means of electrical energy, which is, at least partially, generated by the fuel cell system.

A closed system (fuel cell system or appliance system) is a mobile or stationary system, in which there is no possibility of receiving matter, such as operating gases, from the environment or of releasing matter, such as exhaust gases, into the environment during the mission to be performed by the system.

A compact system (compact fuel cell system or compact appliance system) is a mobile or stationary system without the possibility of, except for water stored in liquid form, storing fuel cell exhaust gas in gaseous or liquid form.

In a closed compact system, there is neither the possibility of receiving matter from the environment (for example the atmosphere) during operation of the fuel cells or of releasing it into the environment, nor the possibility of storing fuel cell exhaust gas (except for water in liquid form). The space situation in certain appliance systems may require not arranging individual components of the fuel cell system, such as gas containers, in the immediate proximity of the fuel cell arrangement. Such a system is considered a compact closed fuel cell system or a compact closed appliance system, respectively, as far as the components concerned are accommodated in or on the appliance system.

A compact system closed on the anode side is a fuel cell system or an appliance system without the possibility of taking in anode operating gas from the environment or of releasing anode exhaust gas into the environment or storing it (except from water in liquid form) during operation of the fuel cells. Such a "semi-closed" compact system combines the advantage of manageability with the advantage that it can be easily operated in closed spaces.

The core element of the fuel cell system according to the invention is a fuel cell arrangement comprising at least one fuel cell. Typically, a fuel cell arrangement comprises a plurality of fuel cells arranged in form of one or more fuel cell stacks. In the present invention, fuel cells with a polymer electrolyte membrane are preferably used. The fuel cells are composed in a known manner. Each fuel cell has anode operating gas flowing therethrough on the anode side and cathode operating gas flowing therethrough on the cathode side. In the present invention, the respective regions are referred to as cathode flowing region and the anode flowing region.

The closed fuel cell system comprises two closed gas circuits, both involving the fuel cell arrangement. The cathode gas circuit comprises a cathode operating gas flow path, the cathode flow region and a cathode exhaust gas flow path; and the anode gas circuit comprises an anode operating gas flow path, the anode flow region and an anode exhaust gas flow path. In the cathode operating gas flow path, fresh cathode operating gas flows to the fuel cell arrangement, flows through the cathode flow region of the fuel cell arrangement (i.e. the cathode flow regions of all fuel cells of the arrangement) and ultimately, cathode exhaust gas leaves the fuel cell arrangement in the cathode exhaust gas flow path. In the same way, in the anode operating gas flow path, fresh anode operating gas flows to the fuel cell arrangement, flows through the anode flow region of the fuel cell arrangement (i.e., the anode flow regions of all fuel cells of the arrangement) and ultimately, anode exhaust gas leaves the fuel cell arrangement in the anode exhaust gas flow path.

In a semi-closed system, only the anode gas circuit is closed. On the cathode side, the system comprises an open cathode gas flow path comprising a cathode operating gas flow path, a cathode flow region and a cathode exhaust gas flow path. The cathode operating gas flow path has air flowing therein, which is preferably taken in from the environment and is fed in via a means for supplying air, such as a fan, blower or ventilator.

In general, the cathode-operating gas comprises a given oxygen concentration, i.e. a pre-determined nominal value of the oxygen concentration, which is less than 100 volume percent, preferably 20 to 50 volume percent, especially preferably 30 to 40 volume percent, of the cathode operating gas. The anode operating gas comprises a given hydrogen concentration, i.e. a predetermined nominal value of the hydrogen concentration, which is preferably 50 to 100 volume percent, especially preferably 100 volume percent, of the anode operating gas. In the present invention, due to partial pressure compensation, the cathode operating gas concentration needs to be approximately the same as the anode operating gas concentration. A good trade-off in the closed system of the present invention is to set both the oxygen concentration and the hydrogen concentration to approximately 40 to 50 volume percent, especially preferably 50 volume percent. In the semi-closed system, the nominal value of the oxygen concentration in the cathode operating gas is determined by the oxygen content of the air, i.e. approximately 21 volume percent. The hydrogen concentration must therefore also be set to approximately 21 volume percent.

The cathode exhaust gas is depleted of oxygen or no longer contains any oxygen and the anode exhaust gas is depleted of hydrogen or no longer contains any hydrogen. The anode exhaust gas and the cathode exhaust gas, however, contain gaseous and liquid water, for example as a result from the fuel cell reaction. The anode exhaust gas and the cathode exhaust gas are "consumed" gases which are no longer suitable for the fuel cell reaction. Therefore, they would have to be discharged from the system, which is, however, not possible in certain cases. According to the invention, in a closed system, the exhaust gases are fed into the respective operating gases (recirculated), i.e. the cathode exhaust gas flow path and the cathode operating gas flow path as well as the anode exhaust gas flow path and the anode operating gas flow path "meet" at a transition point such as to form a closed cathode gas circuit and a closed anode gas circuit. Without the measures according to the invention explained below, this recirculation would rapidly cause a strong enrichment of the inert gas components and the water both in the cathode gas circuit and the anode gas circuit, such that the fuel cell reaction would be interrupted. In a semi-closed system, only the anode exhaust gas is recirculated, while the cathode exhaust gas is released into the environment from the open cathode exhaust gas flow path.

According to the invention, in the cathode-operating gas flow path in a closed system, the oxygen concentration is therefore determined regularly or continuously and, in the anode operating gas flow path, the hydrogen concentration is determined regularly or continuously. The difference with respect to the predetermined nominal value of the oxygen concentration or of the hydrogen concentration, respectively, is compensated by feeding in oxygen from an oxygen reservoir until the predetermined nominal value for oxygen in the cathode operating gas flow path is reached, and by feeding in hydrogen from a hydrogen reservoir until the predetermined nominal value for hydrogen in the anode operating gas flow path is reached. The feed-in point of oxygen into the cathode gas circuit defines the transition point where the cathode exhaust gas flow path transitions into the cathode-operating gas flow path. The feed-in point of hydrogen into the anode gas circuit defines the transition point where the anode exhaust gas flow path transitions into the anode operating gas flow path. In a semi-closed system, one can either assume that the oxygen concentration is approximately 21 volume percent and supplement enough hydrogen to maintain a hydrogen concentration of 21 volume percent in the anode operating gas flow path or determine the oxygen concentration precisely and supplement hydrogen correspondingly, whichever is preferable.

The amount of oxygen and hydrogen to be supplemented, (in a semi-closed system, only hydrogen needs to be supplemented. There is no need to re-supplement oxygen, because fresh air is constantly entering the system) may for example be determined by using the ideal gas law, which renders good results for gas mixtures mainly consisting of hydrogen and inert gas or of oxygen and inert gas. The volume of the cathode gas circuit and the anode gas circuit is known and the pressures and temperatures in the gas circuits can be measured. Further, the amount of inert gas in the cathode gas circuit and the anode gas circuit, i.e. the inert gas partial pressure exerted by the inert gas in the cathode gas circuit and the anode gas circuit, is known. The predetermined nominal value of the oxygen concentration corresponds to a nominal value in the cathode operating gas flow path, and the predetermined nominal value of the hydrogen concentration corresponds to a nominal pressure in the anode operating gas flow path. The difference between the nominal pressure and the measured pressure in the cathode operating gas flow path renders the amount of oxygen to be re-supplemented, and the difference between the nominal pressure and the measured pressure in the anode operating gas flow path renders the amount of hydrogen to be re-supplemented. In the present invention, suitable means for comparing the measured pressures to predetermined nominal pressures and for supplying the required gas amounts are provided. Such suitable means are, for example, pressure reducers in the oxygen flow path towards the cathode gas circuit and in the hydrogen flow path towards the anode gas circuit. The product water generated during the reaction or the portion of gaseous product water in the gas mixtures may be calculated at the outset and may be considered when setting the required inert gas pressure.

The nominal pressures in the anode gas circuit and in the cathode gas circuit, or the cathode flow path, respectively, are the same and preferably range between 300 and 1000 hPA (positive pressure). The temperatures are also the same and preferably range between 54° C. and 65° C.

In a semi-closed system, the maintenance of a desired nominal pressure in the cathode gas flow path is ensured by providing a means in the cathode exhaust gas flow path that opens the flow path to the outside when the nominal pressure is reached, and at the same time prevents a possible flow from the outside into the cathode exhaust gas flow path. Suitable means are, for example, a non-return valve, such as a spring-loaded non-return valve, or a throttle valve. The operating gas air is, in the semi-closed system, preferably supplied via means that simultaneously generate a flow rate in the cathode gas circuit, such as a blower. There is no need to re-supplement oxygen. Hydrogen is re-supplemented as described above for the closed system.

As an alternative to keeping the pressures in the cathode gas circuit and the anode gas circuit constant, the mass flow rates may be kept constant. For this purpose, mass flow meters are provided in the cathode gas circuit and the anode gas circuit. By means of the pressure reducers, oxygen (only in the closed system) and hydrogen, respectively, are then re-supplemented such that the mass flow rates in the cathode gas circuit and in the anode gas circuit remain constant. If mass flow regulators are used instead of mass flow meters, pressure reducers are not necessary. The required amounts of the respective gases may then be supplied by means of the mass flow regulators.

A continuous enrichment of water in the cathode gas circuit and the anode gas circuit of a closed system is prevented by guiding the cathode exhaust gas and the anode exhaust gas through means for separating liquid water. Such suitable means are, for example, water separators. The liquid water accumulates in the water separators, while inert gas, gaseous water and non-consumed oxygen potentially existing in the exhaust gas or non-consumed hydrogen, respectively, are recirculated into the cathode operating gas flow path and the anode operating gas flow path, respectively. In a semi-closed system, water separators in the cathode gas flow path are optional.

For a reliable and smooth functioning of the fuel cells, it is also very important to have the cathode operating gas and the anode operating gas distributed as homogenously as possible in all fuel cells of the fuel cell arrangement and in all zones of the cathode flow regions and the anode flow regions, and, in particular, to keep the cathode flow regions and the anode flow regions free of liquid water. According to the invention, this is achieved by generating a suitable flow rate of the gases in the cathode gas circuit and the anode gas circuit. A suitable flow rate in the cathode gas circuit and the anode gas circuit is, for example, 2 to 4 m/s, preferably 3 m/s in each. For maintaining the flow rate, a recirculation pump may, for example, be provided in the cathode exhaust gas flow path and a recirculation pump may, for example, be provided in the anode exhaust gas flow path. Re-pumping the gases also provides a homogenous mixture of the gas components. Without artificially creating a flow in the cathode gas circuit and the anode gas circuit, for example by means of a recirculation pump, the consumed oxygen would be replaced by re-supplemented oxygen and the consumed hydrogen would be replaced by re-supplemented hydrogen, but the distribution of the re-supplemented reaction gases would be slow and very inhomogeneous and the generated reaction water would not be transported out of the fuel cells. The fuel cells would virtually be operated in dead-end-operation. The fuel cells would eventually be "flooded" and the fuel cell reaction would come to a stop. In a semi-closed system, means such as a pump provided in the cathode gas flow path are optional, because typically, means that per se cause flow, for example blowers, would be used as an air source.

The recirculation pump is operated from the outset, During operation, the pump performance is preferably temporarily increased in regular intervals, depending on the energy generation, for example in intervals of approximately 3 ampere hours. This is to prevent an accumulation of gas or an accumulation of water in "dead corners". A jet nozzle, for example a venturi nozzle, may be used instead of a recirculation pump.

If the fuel cell system is to supply energy over longer periods of time, for example for several days or several weeks, larger amounts of reaction water will accumulate. In such a case, it is reasonable, to adapt the means for separating water in the exhaust gas flow paths such that the separated liquid water can be discharged and collected in a separate larger collecting container. To this end, the water separators in the exhaust gas flow paths are, for example, equipped with level switches and water drain valves. If the water in the water separators has reached a certain level, the water drain valve is opened for a predetermined time, for example approximately 2 seconds, and the exiting water is guided into a larger collecting container, preferably supported by a water pump. To ensure that no gas can exit from the exhaust gas flow paths through the water separators, level switches, which close the water drain valves in due time, may also be provided at the outlet of the water separators. The water drain valves and the respective level switches may be provided on the anode side and/or the cathode side. In semi-closed systems, water separators on the cathode side are optional.

As stated above, the fuel cell arrangement is operated with a cathode operating gas and an anode operating gas, with the oxygen concentration in the cathode operating gas having a predetermined nominal value and the hydrogen concentration in the anode operating gas also having a predetermined nominal value. However, before the fuel cell system can start operating with the predetermined concentrations of oxygen and hydrogen, these concentrations must first be set. To this end, the cathode gas circuit and the anode gas circuit are filled with the amount of inert gas required for operating the fuel cell system each time when taking a closed fuel cell system into operation and before taking the fuel cell arrangement into operation. The required amount of inert gas may, in turn, be calculated by means of the ideal gas law, as both the volumes of the cathode gas circuit and the anode gas circuit and the desired nominal values of the oxygen concentration and the hydrogen concentration, as well as the desired operating conditions of the fuel cell system and the filling temperature are known. The amount of gaseous water generated during the fuel cell reaction, which is taken along in the cathode gas circuit and the anode gas circuit, is also known. This amount may be calculated at the beginning by the system's electronics and considered when setting the required inert gas pressure.

Under predetermined operating conditions (pressure, temperature) of the fuel cell system, the gas in the cathode gas circuit of a closed system has a predetermined pressure (nominal pressure) and a predetermined temperature. A desired or predetermined oxygen concentration (nominal oxygen concentration) in the cathode operating gas corresponds to a given oxygen partial pressure (nominal oxygen partial pressure) and a given inert gas partial pressure (nominal inert gas partial pressure) in the cathode operating gas. Analogously, the gas in the anode gas circuit has a desired. i.e. predetermined hydrogen concentration (nominal hydrogen concentration), which corresponds to a given hydrogen partial pressure (nominal hydrogen partial pressure) and a given nominal inert gas partial pressure in the anode operating gas Before taking the fuel cell arrangement into operation or before starting to draw current from the fuel cell arrangement of a closed system, the operating gas mixtures in the cathode gas circuit and the anode gas circuit are produced from their respective components, which are each stored in suitable reservoirs, for example compressed gas cylinders. There are separated reservoirs for inert gas, hydrogen and oxygen.

Nitrogen is preferably used as inert gas. In the following, the invention is described with nitrogen as inert gas, i.e. the cathode operating gas is "artificial air". However, the present invention is in no way limited to nitrogen as inert gas. In a closed system, other inert gases, such as noble gases, may rather be used instead. A preferred noble gas is helium, which is able to achieve especially high fuel cell performance, as the presence of helium obstructs the fuel cell reaction less than, for example, the presence of nitrogen. The same inert gas is used in the cathode gas and the anode gas circuit. When using natural air, the inert gas is, of course, always nitrogen.

Before initiating operation, the gas circuits are under atmospheric pressure and are filled with inert gas. If necessary, the gas circuits are flushed with the inert gas that is used in operation, for example nitrogen, before taking them into operation. Then the cathode gas circuit is filled with the inert gas (here nitrogen) until the nitrogen pressure corresponds to the nominal inert gas partial pressure. In doing so, it must be considered that the temperature usually differs from the operating temperature during the filling procedure; typically, it is lower. The nitrogen pressure set in the cathode gas circuit needs to be adjusted accordingly. Simultaneously to filling the cathode gas circuit, the anode gas circuit is filled with nitrogen, i.e. the same nitrogen pressure is set in the anode gas circuit as in the cathode gas circuit, or vice versa. It is necessary to fill both gas circuits approximately simultaneously, because if only one of the two gas circuits were filled with nitrogen, the nitrogen in the fuel cells would diffuse through the fuel cell membranes to the side having the lower nitrogen partial pressure. This process would last until a partial pressure balance was reached, i.e. the nitrogen pressure would be the same on both sides of the membranes.

The nitrogen is fed from a nitrogen reservoir via inert gas flow paths into the cathode gas circuit and the anode gas circuit, for example at the same point where oxygen and hydrogen are fed in. Alternatively, other feed-in points are possible. The required nitrogen partial pressure may be set analogously with setting the nominal operating gas pressures, i.e. the pressure and the temperature are preferably measured in the fuel cell gas circuits (cathode gas circuit and anode gas circuit), then it is calculated how high the nitrogen partial pressure must be at the measured temperature and then, via a means such as a pressure reducer in the inert gas flow path, the measured nitrogen pressure is compared to the calculated nominal nitrogen partial pressure and nitrogen is then continued to be supplied until the measured nitrogen pressure corresponds to the nominal nitrogen pressure. Alternatively, the mass flow rate may be measured and, for example, a mass flow regulator may be used as means for supplying inert gas.

Then, oxygen and hydrogen are, respectively, closed into the cathode gas circuit and the anode gas circuit until the nominal pressure of the cathode operating gas or the nominal pressure of the anode operating gas, respectively, is reached, taking into consideration the temperature during the filling procedure. The oxygen and the hydrogen should preferably be fed in substantially simultaneously to keep the differential pressure between the anode side and the cathode side in the fuel cells as low as possible. A defined concentration ratio of hydrogen and oxygen is set. The differential pressure between the set inert gas partial pressure and the set operating gas pressure (anode operating gas pressure, cathode operating gas pressure) corresponds to the partial pressure of the reaction gas (oxygen partial pressure, hydrogen partial pressure). The ratio between the hydrogen partial pressure and the oxygen partial pressure corresponds to the concentration ratio of hydrogen and oxygen. In the present invention, the partial pressures of hydrogen and oxygen are approximately the same. Since during the reaction, twice as much hydrogen is consumed as oxygen, a correspondingly higher amount of hydrogen needs to be re-supplemented during fuel cell operation.

After setting the nominal concentrations of hydrogen and oxygen in the fuel cell operating gases, the fuel cell arrangement can be taken into operation, i.e. a continuous operation can be started and electrical current can be drawn.

In a semi-closed system comprising a closed anode gas circuit and an open cathode gas circuit, the predetermined hydrogen concentration only needs to be set in the anode gas circuit before taking the fuel cell system into operation. This hydrogen concentration corresponds to the oxygen concentration in the ambient air, which is used as operating gas on the cathode side. Under operating conditions, the same temperatures and nominal operating gas pressures exist in the anode gas circuit and the cathode gas flow path, analogously to the closed system.

In a semi-closed system, air is first fed into the cathode gas flow path and nitrogen is simultaneously fed into the anode gas circuit, thereby setting a nitrogen partial pressure that corresponds to the nitrogen partial pressure in the air in the cathode gas flow path. Subsequently, hydrogen is closed into the anode gas circuit until the pressure in the anode gas circuit and the cathode gas flow path are the same. The procedure is principally the same as described above for a closed system except that the above-described steps can only be performed on the anode side, while on the cathode side, air continuously flows through the cathode gas flow path.

With this procedure, there is an initial pressure difference between the anode gas circuit and the cathode gas flow path, which is, however, in a tolerable range.

After switching off the fuel cell system, gas remains in the gas flow paths and liquid water remains in the water collection containers. Before retaking the fuel cell system into operation, the water should, respectively, be removed from the water collection containers and, preferably, the gas also should be removed from the cathode gas circuit or the cathode gas flow path, respectively, and from the anode gas circuit. To this end, suitable, openings or valves may be provided in the containers or in the gas flow paths. Preferably, between two usages or rather between two operating times of the fuel cell system, the cathode gas circuit or the cathode gas flow path, respectively, and the anode gas circuit are flushed with inert gas in order to remove potentially remaining water and to provide a suitable gas filling for a restart of the system.

If the fuel cell system is to be operated at a relatively small positive pressure or a relatively small inert gas concentration, the amount of inert gas existing in the gas circuits before taking them into operation may be too larger, i.e. the nominal inert gas partial pressure to be set is smaller than the atmospheric pressure or the ambient pressure. In such a case, the gas circuits (or the anode gas circuit, in the case of a semi-closed system) are evacuated until the desired nominal inert gas partial pressure is reached or evacuated until a pressure below the nominal inert gas partial pressure to be set is reached, and then the desired nominal inert gas partial pressure is set by supplying inert gas.

In order to release as little hydrogen into the environment, i.e. into the atmosphere, as possible, a so-called bleeding resistor may be connected between the anode end plate and the cathode end plate. The connectable bleeding resistor causes reaction gases remaining in the system to be consumed after switching off the system and substantially inert gas to remain in the cathode gas circuit and the anode gas circuit.

For safety reasons, it is preferable to provide, in the cathode gas circuit or the cathode gas flow path, respectively, and/or the anode gas circuit, preferably in both of them, a pressure switch, which monitors the pressure of the cathode operating gas and the anode operating gas and switches to a safe mode by means of a safety circuit if the maximum pressure of the system is exceeded. When the maximum pressure is exceeded, the gas supply is interrupted. The interruption of the gas supply is detected by the safety logic of the fuel cell system and the system is then switched off.

As further safety means, stop valves may be provided in the gas flow paths leading from the gas reservoirs to the cathode gas circuit and the anode gas circuit, respectively, in order to prevent the respective gases (hydrogen and/or nitrogen and/or oxygen) from being fed in at a wrong point in time. Further appropriate safety means are non-return valves provided in the gas flow paths leading from the gas reservoirs (hydrogen and/or nitrogen and/or oxygen) to the gas feed-in points in the cathode gas circuit and the anode gas circuit in order to prevent the operating gases from flowing back if, erroneously, both inert gas and oxygen are fed into the cathode gas circuit (in a closed system) or, erroneously, both inert gas and hydrogen are fed into the anode gas circuit.

Closed and semi-closed systems according to the invention are principally identical on the anode side. In particular, both preferably have, on the anode side, one or more of the following features which may be combined with each other in any desired combinations.

The fuel cell system comprises a means for feeding either hydrogen from the hydrogen flow path or nitrogen from the nitrogen flow path into the anode gas circuit at the transition point of the anode gas circuit.

The means for supplying nitrogen to the anode gas circuit is a pressure reducer in the nitrogen flow path and/or the means for supplying hydrogen to the anode gas circuit is a pressure reducer in the hydrogen flow path.

The anode gas circuit comprises a means for generating a pressure below the ambient pressure in the anode gas circuit.

The fuel cell system comprises at least one container for storing liquid water, which is connected in a fluid manner to the means for separating liquid water from the anode exhaust gas, preferably via a water pump.

The fuel cell system further comprises a level switch in the means for separating liquid water from the anode exhaust gas and/or a means for discharging gas from the anode exhaust gas flow path.

The fuel cell system comprises a non-return valve and/or a stop valve in the nitrogen flow path leading from the nitrogen source to the anode gas circuit.

The fuel cell system comprises a pressure switch in the anode gas circuit.

During operation of the fuel cell system, there is a positive pressure of 300 to 1000 hPa in the anode gas circuit and/or the gas flow rate in the anode gas circuit is 2 to 4 m/s. The operating pressure and the gas flow rates are each identical in the anode gas circuit and in the cathode gas circuit or the cathode gas flow path, respectively.

The fuel cell system according to the invention is principally suitable for supplying any appliances with electrical energy. The advantages of the fuel cell system according to the invention are especially useful in all appliance systems that should be or must be closed, whether this be for technical or other reasons, such as in devices to be used in closed spaces or vehicles, in particular in submarine vehicles.

Figure 2:
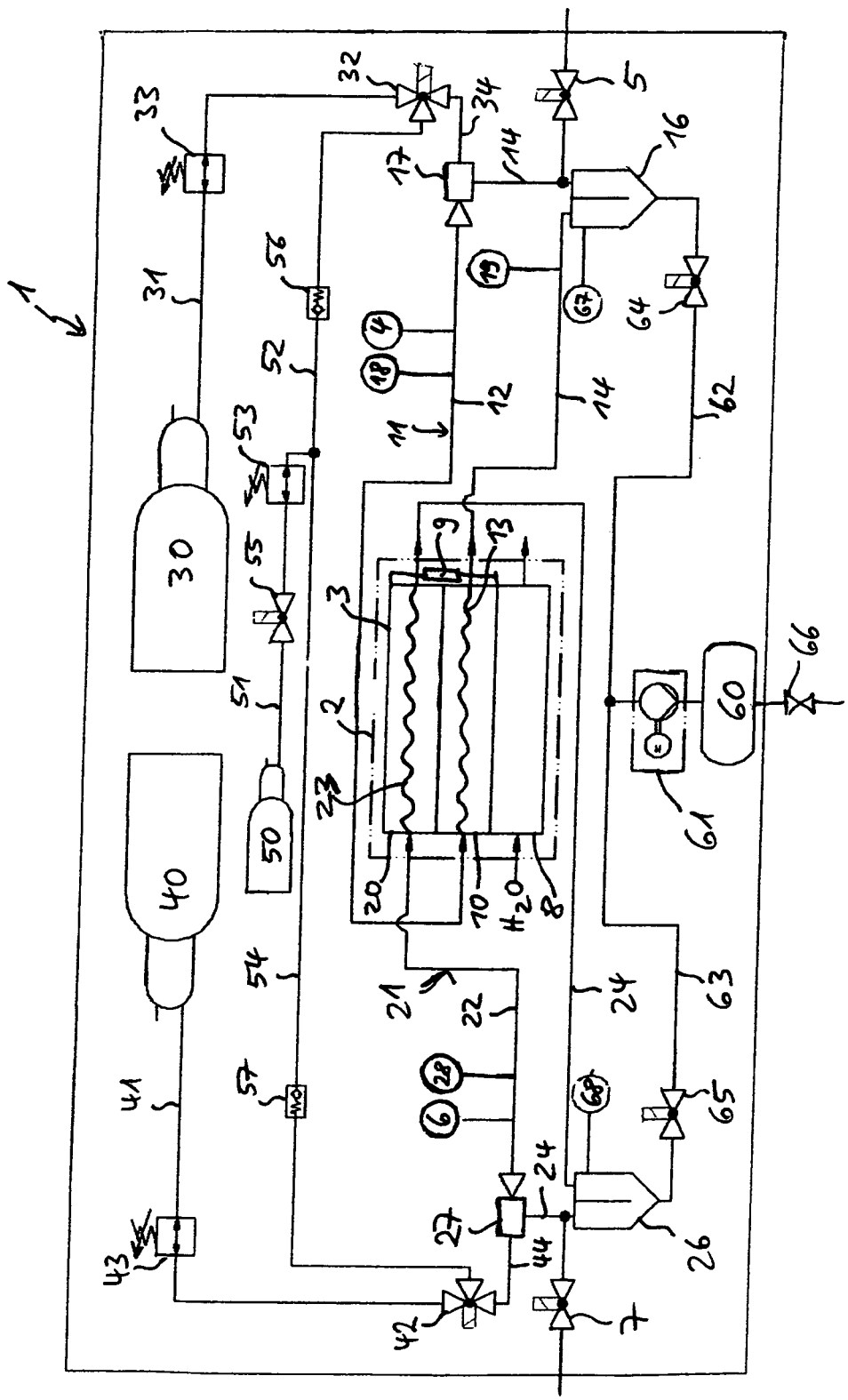
Figure 3:
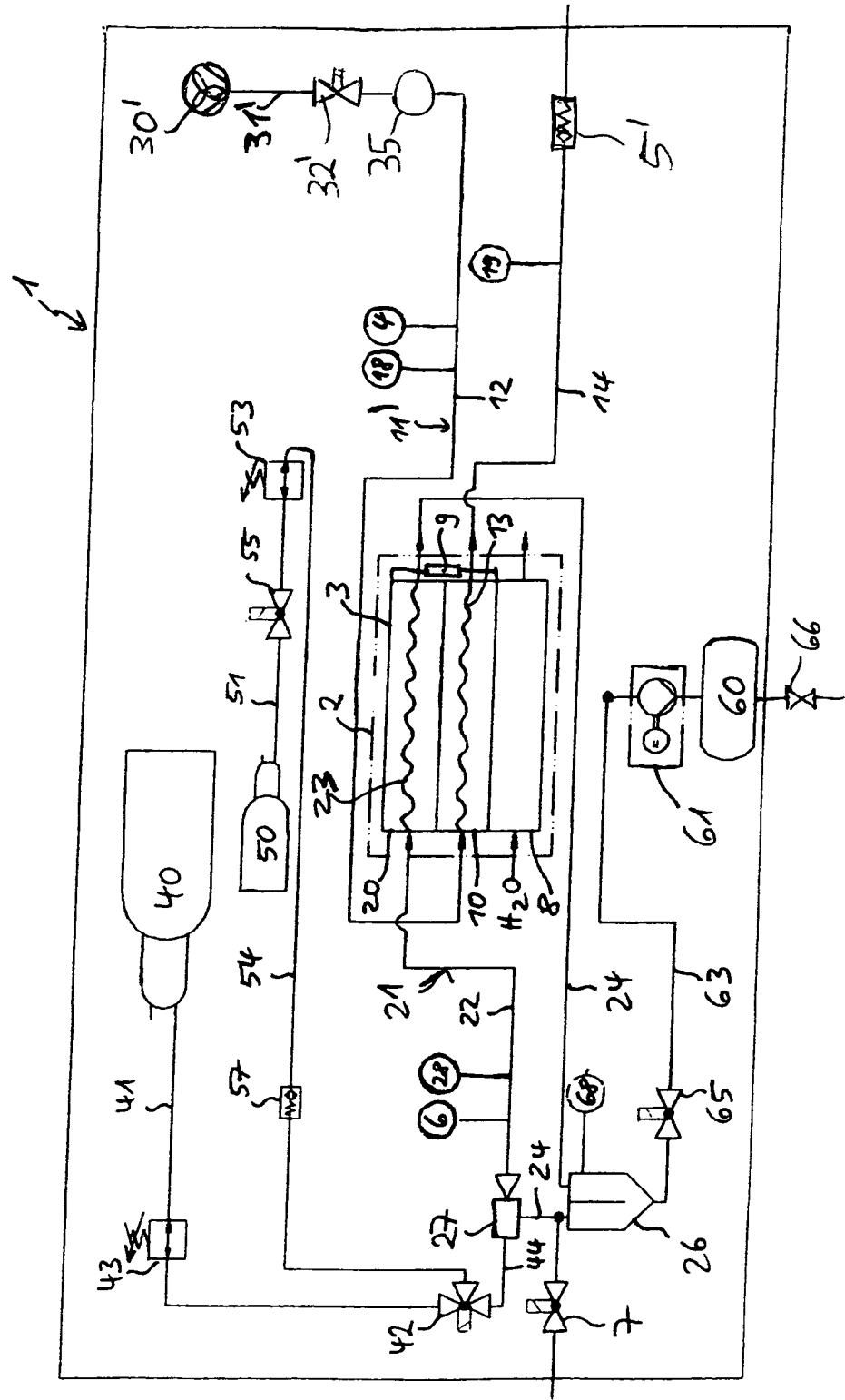

In the following, the invention will be further illustrated by means of drawings. It is noted that the drawings are neither drawn to scale nor proportional. Furthermore, only the features essential for understanding the present invention are shown. It is understood that additional features may be present and that not all features shown are essential for the functioning of the present invention. In the figures:

FIG. 1 shows a schematic illustration of an embodiment of a fuel cell system according to the invention, FIG. 2 shows a schematic illustration of an alternative embodiment of a fuel cell system according to the invention, and FIG. 3 shows a schematic illustration of another alternative embodiment of a fuel cell system according to the invention.

FIG. 1 shows a schematic illustration of an embodiment of a fuel cell system 1 according to the invention. The fuel cell system 1 comprises a fuel cell arrangement 2 consisting, in the illustrated embodiment, of a single fuel cell 3. In reality, a fuel cell arrangement comprises a plurality of fuel cells, typically several fuel cell stacks, each having a plurality of fuel cells. The fuel cells are of an actually conventional construction, for example polymer electrolyte membrane fuel cells having a cathode 10 and an anode 20, which are each supplied with operating gas over as much of their area as possible. The operating gas typically flows in flowing fields, which are in FIG. 1 schematically illustrated as the cathode flow region 13 and the anode flow region 23. For cooling, the illustrated fuel cell 3 comprises a cooling plate 8.

The fuel cell system is operated with artificial air, i.e. with a mixture of oxygen and nitrogen, the oxygen content of the artificial air preferably being 20 to 50 volume percent, especially preferably 40 to 50 volume percent. During operation of the fuel cell system 1, the artificial air is continuously generated from the components oxygen and nitrogen and supplied to the fuel cell arrangement 2. The operating gas on the anode side is a mixture of hydrogen and nitrogen, which is also continuously generated from the components hydrogen and nitrogen and supplied to the fuel cell arrangement 2 during operation of the fuel cell system 1. The hydrogen concentration in the anode operating gas equals the oxygen concentration in the cathode gas circuit.

The reaction gases oxygen and hydrogen as well as the inert gas nitrogen are provided in suitable reservoirs, in the illustrated embodiment a compressed-oxygen cylinder 30, a compressed-hydrogen cylinder 40 and a compressed-nitrogen cylinder 50. The nitrogen reservoir may be much smaller than the reaction gas reservoirs, because no nitrogen is consumed during the fuel cell reaction, since during the entire fuel cell operation, the same amount of nitrogen is circulated.

The size of the reaction gas reservoirs depends on the scheduled fuel cell operation time. The reservoirs are of course not limited to compressed gas cylinders.

An essential aspect of the present invention is the provision of the fuel cell system with a closed cathode gas circuit 11, into which either nitrogen or oxygen is fed in, and with a closed anode gas circuit 21, into which either hydrogen or nitrogen is fed in. The cathode gas circuit 11 is composed of a cathode operating gas flow path 12, which transitions into the cathode flow region 13 at the fuel cell gas inlet, which, in turn, transitions into a cathode exhaust gas flow path 14 at the fuel cell gas outlet. The cathode exhaust gas flow path 14, in turn, opens at a transition point 15 into the cathode operating gas flow path 12. The anode gas circuit 21 is composed of an anode operating gas flow path 22, which transitions into the anode flow region 23 at the fuel cell gas inlet, which in turn transitions into an anode exhaust gas flow path 24 at the fuel cell gas outlet. The anode exhaust gas flow path 24 opens into the anode operating gas flow path 22 at a transition point 25. The fuel cell system of the present invention is thus adapted for fully recirculating the fuel cell exhaust gases and not releasing any exhaust gas into the environment. The flow paths are hose lines or pipes.

The cathode flow region 13 and the anode flow region 23 are commonly "fanned out", i.e. there are gas distributors at the fuel cell gas inlet, which distribute the cathode-operating gas and the anode-operating gas as evenly as possible over the entire fuel cell arrangement 2, and there are collectors at the fuel cell gas outlet, which collect the cathode exhaust gas and the anode exhaust gas and feed them into the cathode exhaust gas flow path 14 and the anode exhaust gas flow path 24, respectively.

A pressure sensor 18 in the cathode operating gas flow path 12 and a temperature sensor 19 with the cathode exhaust gas flow path 14 serve to determine the gas pressure and the gas temperature in the cathode gas circuit 11.

A pressure sensor 28 in the anode operating gas flow path 22 and a temperature sensor 29 in the anode exhaust gas flow path 24 serve to determine the pressure and the temperature of the gas in the anode gas circuit 21. However, it is also sufficient to only provide one of the temperature sensors 19, 29, preferably the temperature sensor 19 in the cathode gas circuit, because the gas temperatures in the anode gas circuit and the cathode gas circuit are approximately the same both during the filling procedure and during operation of the fuel cell system. Furthermore, the sensors may be located at an arbitrary location in the cathode gas circuit 11 and in the anode gas circuit 21. The system's electronics can calculate the amount of the gas in the cathode gas circuit 11 and in the anode gas circuit 21 from the measured pressure and the measured temperature.

In the illustrated embodiment, oxygen is fed from the compressed gas cylinder 30 via an oxygen flow path 31 (oxygen line 31), in which a pressure reducer 33 is located, to a valve 32 to feed it into the cathode gas circuit 11. Hydrogen is guided from the compressed gas cylinder 40 via a hydrogen flow path (hydrogen line) 41, in which a pressure reducer 43 is located, to a valve 42 for feeding it into the anode gas circuit 21. Nitrogen is guided from a compressed gas cylinder 50 via an inert gas flow path 51, 52 to the valve 32 to feed it into the cathode gas circuit 11 and similarly via an inert gas flow path 51, 54 to the valve 42 to feed it into the anode gas circuit 21. In the partial section 51 of the inert gas flow path, a pressure reducer 53 and an optional stop valve 55 are provided, the stop valve 55 making it possible to reliably prevent nitrogen from flowing into the cathode gas circuit 11 and the anode gas circuit 21 at the wrong point in time. By providing the pressure reducer 53 in the partial section 51 of the inert gas flow path, it is ensured that the same inert gas partial pressure is set in the cathode gas circuit 11 and in the anode gas circuit 21.

In the illustrated embodiment, nitrogen and oxygen are, via a common means 32, which allows either oxygen or nitrogen to be fed in, such as a valve that can be switched between supplying oxygen and supplying nitrogen, fed into the cathode gas circuit 11 at a feed-in point (transition point) 15. Nitrogen and hydrogen are analogously, via a common valve 42, which can be switched between supplying hydrogen and supplying nitrogen, fed into the anode gas circuit 21 at a feed-In point (transition point) 25, Suitable valves 32 and 42 are for example 3-2-way magnetic valves, in general, magnetic valves are preferably used for all valves.

As an alternative, it is also possible to separately supply oxygen and nitrogen to the cathode gas circuit 11 and/or hydrogen and nitrogen separately to the anode gas circuit 21. The point where oxygen is fed in defines the transition point 15 and the point where hydrogen is fed in defines the transition point 25. Nitrogen can principally be fed in at an arbitrary location of the cathode gas circuit 11 and the anode gas circuit 21, respectively, of course outside the fuel cells themselves. If the supplies are separated, it is preferable to provide a stop valve in the inert gas flow path, the oxygen flow path and the hydrogen flow path in order to prevent nitrogen and oxygen from being simultaneously fed into the cathode gas circuit and nitrogen and hydrogen from being simultaneously fed into the anode gas circuit.

The fuel cell arrangement 2 is, on the cathode side, operated with artificial air, for example having an oxygen portion of 50 volume percent, and on the anode side, with a hydrogen/nitrogen mixture. If the oxygen portion is 50 volume percent, the hydrogen portion is also 50 volume percent. Before starting continuous fuel cell operation and drawing energy, the anode gas circuit 21 and the cathode gas circuit 11 are filled with the desired operating gases. This procedure is explained by means of concrete exemplary numbers in the following.

Formula $$p \cdot V = \frac{m}{M} \cdot R \cdot T$$

(p=pressure; V=volume, m=mass; M=molar mass; R=gas constant; T=temperature), which can be applied with very good approximation, implies that for setting the desired reaction gas concentrations (nominal concentrations), pressure and temperature, as well as mass and molar mass of the involved gases and the volume to be filled, are of importance.

For an exemplary volume of the cathode gas circuit of $V_g=0.0035$ m$^3$, a desired reaction pressure (nominal pressure) of the cathode operating gas of $p_g=4451$ hPa absolute (445100 kg·m$^{-1}$·s$^{-2}$ absolute), a temperature of the gas in the cathode gas circuit of $T_g=327$ K (54° C.) and a desired oxygen concentration of 50 Vol-% ($\chi_{O2}=0.5$), for a molar mass of oxygen $M_{O2}=15.9994$ g·mol$^{-1}$, a molar mass of nitrogen $M_{N2}=14.0067$ g·mol$^{-1}$ and the gas constant R=8.312 J·mol$^{-1}$·K$^{-1}$, for the entire mass of the gas $m_g=m_{O2}+m_{N2}$ in the cathode gas circuit 11 at a stable point of time before the continuous operation of the fuel cells, i.e. before starting to draw current without a gaseous or liquid water portion, this yields:

$$m_g = [M_{O2} \cdot \chi_{O2} + M_{N2}(1 - \chi_{O2})] \cdot \frac{p_g \cdot V_g}{R \cdot T_g}$$

Applying the above numerical values yields 11 $m_g=9.170$ g for the required overall mass of the gas in the cathode gas circuit. When taking the ratio of the molar masses of oxygen and nitrogen $M_{O2}/M_{N2}=15.9994:14.0067$ into consideration, the mass of oxygen will be $m_{O2}=4.585$ g and the mass of nitrogen will be $m_{N2}=4.281$ g.

If nitrogen is filled in at a temperature of 23° C. (298K), a nitrogen partial pressure $p_{N2}$ must be set, which results from:

$$p_{N2} = \frac{m_{N2} \cdot R \cdot 296 \text{ K}}{M_{N2} \cdot V_g} = 2149 \text{ hPa (absolute)}.$$

This partial pressure is set in the cathode gas circuit 11 and in the anode gas circuit 21 when taking the fuel cell system into operation.

The above calculation, however, does not consider the fact that during the fuel cell reaction, water is generated as a reaction product, a certain proportion of which is taken along in gaseous form in the cathode gas circuit and the anode gas circuit. The gaseous water replaces part of the inert gas such that when taking the fuel cell system into operation, correspondingly less inert gas must be fed into the cathode gas circuit 11 and into the anode gas circuit 21. The required amount of inert gas when considering the generated reaction water, can be calculated according to the Wagner equation $$p_{sat} = p_c \cdot \exp \left\{ \frac{T_c}{T_g} \cdot \left[ A \cdot \left(1 - \frac{T_g}{T_c}\right) + B \cdot \left(1 - \frac{T_g}{T_c}\right)^{15} + C \cdot \left(1 - \frac{T_g}{T_c}\right)^3 + D \cdot \left(1 - \frac{T_g}{T_c}\right)^6 \right] \right\}$$

$p_{sat}$ refers to the saturation pressure, $p_c$ to the critical gas pressure and $T_c$ to the critical water temperature. $p_c$ is 220600 hPa and $T_c$ is 641.1 K. $T_g$ refers to the temperature of the gas in the cathode gas circuit and the anode gas circuit, respectively, and A, B, C, D are Wagner coefficients (A=−7.71374, B=1.31467, C=−2.51444, D=−1.72542). With respect to the Wagner equation and the values cited above, reference is made to the VDI Wärmeatlas $10^{th}$ edition, Springer-Verlag Berlin, Heidelberg 2006.

Applying the parameters yields $\chi_{H2O}=p_{sat}/p_g=0.249$ for the concentration $\chi_{H2O}$ of gaseous water in the cathode gas circuit and the anode gas circuit.

$p_g$ refers to the nominal pressure of the cathode operating gas and the anode operating gas, respectively (4451 hPa absolute).

The overall mass of the gas $m_g=m_{O2}+m_{N2}+m_{H2O}$ in the cathode gas circuit 11 at a stable point in time during operation of the fuel cell thus yields $$m_g = [M_{O2} \cdot \chi_{O2} + M_{N2} \cdot (1 - \chi_{O2} - \chi_{H2O}) + M_{H2O} \cdot \chi_{H2O}] \cdot \frac{p_g \cdot V_g}{R \cdot T_g}$$

$V_g$, $T_g$ and $\chi_{O2}$ are to be specified as stated above for the calculation without a gaseous water portion.

Applying the parameters yields $m_{O2}$=4.585 g for the mass of oxygen, $m_{N2}$=2.018 g for the mass of nitrogen and $M_{H2O}$=2.567 g for the mass of gaseous water. The overall mass $m_g$ of the gas is 9.170 g.

If the temperature $T_0$ is 296K when filling the anode gas circuit and the cathode gas circuit with nitrogen when taking the fuel cell system into operation, a nitrogen pressure needs to be set that results from $$p_{N2} = \frac{m_{N2} \cdot R \cdot T_0}{M_{N2} \cdot V_g}$$

This yields a nitrogen pressure $p_{N2}$ of 1013 hPa absolute.

When taking the fuel cell system 1 into operation and before taking the fuel cell arrangement 2 into operation, a nitrogen partial pressure of 1013 hPa is substantially simultaneously set in the cathode gas circuit and the anode gas circuit. The nitrogen partial pressure of 1013 hPa in the cathode gas circuit 11 is set by opening the valve 55 in the inert gas flow path 51, thus having nitrogen flow to the 3-2-way valve 32, which can be switched between supplying oxygen and supplying nitrogen. The valve 32 is switched to nitrogen supply such that nitrogen flows into the cathode gas circuit 11 through a flow path 34 at the transition point 15. The nitrogen pressure is measured by means of the pressure sensor 18, and the pressure reducer 53 in the inert gas flow path 51 compares the measured pressure with the nominal value of 1013 hPa and lets nitrogen flow in until a nitrogen pressure of 1013 hPa is reached (the pressures each refer to absolute pressures).

The anode gas circuit 21 is filled with nitrogen substantially simultaneously with filling the cathode gas circuit 11. Filling the anode gas circuit substantially simultaneously with the same nitrogen pressure as exists in the cathode gas circuit is necessary for preventing nitrogen from migrating due to partial pressure compensation. For filling the anode gas circuit 21 with nitrogen, the 3-2-way valve 42, which can be switched between supplying hydrogen and nitrogen, is switched to nitrogen supply such that nitrogen flows through a nitrogen flow path 44 to the transition point 25 and into the anode gas circuit 21. The nitrogen pressure in the anode gas circuit 21 is measured by means of the pressure sensor 28. The pressure reducer 55 compares the measured pressure with the nominal pressure of 1013 hPa to be set and lets nitrogen flow in until this pressure is reached.

Subsequently, the operating gas mixtures are produced. To this end, the valve 32 is switched to oxygen supply and the valve 42 is switched to hydrogen supply. Since in the embodiment, the cathode operating gas has an oxygen portion of 50 volume percent, the oxygen partial pressure $p_{O2}$ to be set equals the nitrogen partial pressure $p_{N2}$ without considering the reaction water, ergo 2149 hPa. For the overall operating gas pressure $p_g$ at the filling temperature of 23° C., a pressure of 4156 hPa thus needs to be set. This pressure is set in the cathode gas circuit 11 analogously to the nitrogen partial pressure, i.e. the pressure $p_g$ is measured by means of the pressure sensor 18, and a pressure reducer 33 compares the measured pressure with the required nominal value. As long as the measured pressure is smaller than the required nominal value of 4156 hPa, the pressure reducer valve is opened far enough to have sufficient oxygen flow into the cathode gas circuit in order to reach the required nominal value. As soon as the pressure measured by the pressure sensor has reached the required nominal value, the valve of the pressure reducer 33 closes. Simultaneously, in the anode gas circuit 21, a gas pressure $p_g=p_{H2}+p_{N2}$ of 4156 hPa is also set by measuring the pressure $p_g$ in the anode gas circuit 21 by means of the pressure sensor 28 and then comparing the measured pressure of the pressure reducer 43 to the setpoint. The valve of the pressure reducer 43 is opened to let hydrogen flow into the anode gas circuit 21 until reaching the setpoint. The pressure reducer valve is then closed. The valves 32 and 42 keep theft position, i.e. they remain set to oxygen flow and hydrogen flow, respectively. The fuel cell system 1 is now ready to take the fuel cell arrangement 2 into operation. The pressures each refer to absolute pressures.

The above example was chosen such that the nitrogen partial pressure to be set approximately corresponds to the atmospheric pressure, such that the suitable nitrogen partial pressure is set by simply flushing the cathode gas circuit and the anode gas circuit with nitrogen. Under operating conditions, however, this yields operating gas pressures above the preferred range of 300 to 1000 hPa (positive pressure) according to the present invention. For setting operating gas pressures in the preferred range, nitrogen partial pressures (absolute pressures) need to be set such as to be smaller than the atmospheric pressure, i.e. the cathode gas circuit and the anode gas circuit must be evacuated before setting the desired inert gas pressures. To this end, the cathode gas circuit and the anode gas circuit each preferably have a means for generating a vacuum, such as a vacuum pump (not shown in the figures), provided therein. Small, light pumps with low throughput are sufficient, because there is no need to generate a high vacuum. It is sufficient to be able to generate the nitrogen partial pressure to be set (for example approximately 200 to 800 hPa) or a pressure slightly below the nitrogen partial pressure to be set, such that the desired nitrogen partial pressure (nominal nitrogen partial pressure) can be set by supplying nitrogen as described above.

Before taking the fuel cell arrangement 2 into operation and preferably already while filling the cathode gas circuit 11 and the anode gas circuit 21, a recirculating flow is generated both in the cathode gas circuit and the anode gas circuit in order to achieve a proper gas distribution and mixing of inert gas and reaction gas, for example by means of a recirculation pump 17 in the cathode exhaust gas flow path 14 and by means of a recirculation pump 27 in the anode exhaust gas flow path 24. As an alternative, one or both pumps may be replaced by a jet nozzle. It is important to maintain a flow rate in order to ensure that fresh operating gases are constantly transported into the fuel cells and consumed gases and water formed during the fuel cell reaction are transported out of the fuel cells.

The water formed during the fuel cell reaction needs to be removed from the fuel cell exhaust gas, because it would otherwise continue to enrich in the cathode gas circuit and the anode gas circuit and eventually flood the fuel cells. Therefore, a water separator 16 is provided in the cathode exhaust gas flow path 14 and a water separator 26 is provided in the anode exhaust gas flow path 24. In the water separators 16, 26, the liquid water is separated from the gas flow and collected, while gaseous water remains in the cathode exhaust gas and the anode exhaust gas. After separating the liquid water, the entire exhaust gas is fed into the cathode operating gas flow path 12 and the entire anode exhaust gas is fed into the anode operating gas flow path 22. Since the fuel cell exhaust gases are fed into the operating gas flow paths during the operation of the fuel cell arrangement 2, the operating gases become depleted of the reaction gases oxygen and hydrogen, such that the pressure measured by the pressure sensors 18 and 28 is lower than the nominal pressure at the respective gas temperature measured by means of the temperature sensors 19 and/or 29 in the cathode exhaust gas flow path 14 and/or the anode exhaust gas flow path 24. According to the invention, the pressure in the cathode gas circuit 11 and the anode gas circuit 21 is, however, kept constant during the operation of the fuel cell arrangement 2. To this end, a means for supplying oxygen to the cathode gas circuit 11 and a means for supplying hydrogen to the anode gas circuit 21 is provided such that the supplied amounts of oxygen and hydrogen can be regulated. In the illustrated embodiment, a pressure reducer 33 and a pressure reducer 43 are used. The pressure in the cathode gas circuit 11 and anode gas circuit 21 is kept constant by having the valve of the pressure reducer 33 and the valve of the pressure reducer 43 open sufficiently far for having oxygen and hydrogen continuously flow into the cathode gas circuit 11 and the anode gas circuit 21, respectively, in order to supplement the consumed oxygen and the consumed hydrogen, respectively.

As alternative means for appropriately supplying oxygen, hydrogen and nitrogen, mass flow regulators may be used.

In the illustrated embodiment, the water separators 16 and 26 are each provided with a ievel switch 67 and 68, respectively, and with a water drain valve 64 and 65, respectively. The level switches 67, 68 monitor the fill level of the water separators 16, 26 and ensure that a predetermined filling level is not exceeded. As soon as the water level in the water separator 16, 26 has risen sufficiently far for wetting the level switches, the water drain valves 64, 65 are opened and water is drained. The drain time is chosen such that some water remains in the water separators 16, 26 to prevent cathode exhaust gas and anode exhaust gas from flowing out. Suitable drain times range between 1 and 3 seconds. The drained water flows through pipes 63, 63 into a water collection tank 60, supported by a water pump 61, which is operated each time one of the water drain valves 64, 65, or both, are opened.

The illustrated embodiment comprises a pressure switch 4 in the cathode operating gas flow path 12 and a pressure switch 6 in the anode operating gas flow path 22. These pressure switches monitor the pressure of the operating gases and switch the entire system into a safe mode by means of a safety circuit if a predetermined maximum pressure of the cathode operating gas and the anode operating gas, respectively, is exceeded, as described above.

In the nitrogen flow paths 52 and 54, non-return valves 56, 57 are provided. The non-return valve 56 prevents a return flow of the cathode operating gas if the valve 32 is erroneously switched to nitrogen flow during operation of the fuel cell arrangement 2 and the non-return valve 57 prevents a return flow of the anode operating gas if the valve 42 is erroneously switched to nitrogen flow during operation of the fuel cell arrangement 2.

Another embodiment of a closed fuel cell system 1 according to the invention is schematically illustrated in FIG. 2. The fuel cell system according to the embodiment illustrated in FIG. 2 is, with respect to most of the components, identical to the fuel cell system illustrated in FIG. 1. The same reference numbers refer to the same or to corresponding components. The fuel cell system illustrated in FIG. 2 comprises only one temperature sensor 19 in the cathode gas circuit 11. A connectable bleeding resistor 9 provides for the generation of fuel cell power and thus for the consumption of reaction gases after switching off the fuel cell system. Furthermore, in the embodiment illustrated in FIG. 2, as means for generating a flow in the cathode gas circuit 11 and the anode gas circuit 21, venturi nozzles 17 and 27 are provided at the transition point 15 of the cathode gas circuit and the transition point 25 of the anode gas circuit. By having gas flow from the lines 34 and 44, respectively, into the venturi nozzles, the exhaust gas from the lines 14 and 24 is sucked in and fed into the cathode operating gas flow path 12 and the anode operating gas flow path 22, respectively.

Furthermore, the fuel cell system illustrated in FIG. 2 comprises a valve 5 for discharging gas from the cathode gas circuit 11 and a valve 7 for discharging gas from the anode gas circuit 21. After switching off the fuel cell system or at least before retaking the fuel cell system into operation, the remaining gases in the system and the remaining water in the system should be drained. This may, for example, be carried out by the valve 5 in the cathode exhaust gas flow path 14 and the valve 7 in the anode exhaust gas flow path 24, as well as a water drain valve 66. The gases and the water are released into the environment of the fuel cell system or, in a fuel cell system built into an appliance system, into the environment of the appliance system the fuel cell system is built into, i.e. into the atmosphere, however only after the mission to be performed by the appliance system is completed. However, during an ongoing mission, the appliance system represents a completely closed system, which is, in particular, of importance in cases of vehicles such as submarine vehicles. The gases may, however, after completing the mission to be performed by the appliance system, also be discharged from the gas circuits in a different way than by means of valves 5, 7, for example together with the water collected in the water separators 16, 26 through the outlets thereof.

Another embodiment of a fuel cell system 1 according to the invention is schematically illustrated in FIG. 3. The embodiment illustrated in FIG. 3 is a semi-closed system, i.e. the system is only closed on the anode side, while on the cathode side, air can be sucked in from the environment and the oxygen-depleted air can be re-released into the environment after the fuel cell reaction. The fuel cell system according to the embodiment illustrated in FIG. 3 is, on the anode side, identical to the fuel cell system illustrated in FIG. 2. The same reference numbers refer to the same or to corresponding components.

The fuel cell system 1 according to FIG. 3 comprises a cathode gas flow path 11', which comprises a cathode operating gas flow path 12, a cathode flow region 13 and a cathode exhaust gas flow path 14. The cathode operating gas flow path 12 and the cathode exhaust gas flow path 14 are fluidly separated from each other. Air, preferably natural ambient air, is fed in as cathode operating gas into the cathode gas flow path 30' through an air source 11'. A preferred air source is a blower with a performance that ensures a sufficient flow rate of the cathode operating gas in the cathode gas flow path 11'.

The cathode gas flow path 11' has a sensor 35 for detecting the oxygen concentration and the nitrogen portion, respectively, in the supplied cathode operating gas, a pressure sensor 18, a temperature sensor 19 and a pressure switch 4 provided therein. The sensors 35, 18 and 19 and the pressure switch 4 are optional components. The stop valve 32' illustrated in FIG. 3, which allows for separating the cathode gas flow path 11' from the air source 30', is also optional. The air source 30' and the valve 32' are connected by means of an air flow path 31'.

Air supplied by the air source 30' flows into the cathode operating gas flow path 12, flows through the cathode flow region 13 and ultimately exits the fuel cell arrangement as oxygen-depleted cathode exhaust gas through the cathode exhaust gas flow path 14. The cathode exhaust gas flow path 14 releases the cathode exhaust gas into the environment. A means for providing a certain resistance to the exiting cathode exhaust gas and at the same time preventing a potential flow of gas in the counter direction, such as a spring-biased non-return valve or a throttle valve, is provided in the cathode exhaust gas flow path 14. The means 5' ensures the maintenance of the desired cathode operating gas pressure during the operation of the fuel cell system 1.

Before taking the fuel cell system according to FIG. 3 into operation, ambient air is first taken into the cathode operating gas flow path 12 by means of the air source 30' and, simultaneously, nitrogen is taken into the anode operating gas flow path 22 from the nitrogen source 50 (if applicable, after first evacuating the anode gas circuit 21), thereby setting a nitrogen partial pressure corresponding to the nitrogen partial pressure of the air in the cathode operating gas flow path 12. Setting the required nitrogen partial pressure in the anode gas circuit 21 is carried out in the same manner as described above for the closed systems. Subsequently, hydrogen is fed into the anode operating gas flow path 22 from the hydrogen source 40 until the same pressure exists in the anode gas circuit 21 and the cathode gas flow path 11'. On the anode side, the procedure is the same as described above for the closed systems. Of course, it must be taken into consideration here that, during the operation of the fuel cell system, the temperature changes and product water is formed. On the anode side, the product water needs to be separated from the anode exhaust gas and collected in a collection container, as described above. The separation of product water from the cathode exhaust gas is optional. Alternatively, the product water may also be released into the environment together with the cathode exhaust gas.

A closed fuel cell system may, with slight modifications, also be operated as a system closed on the anode side or a system closed on the cathode side. If, for example, the system illustrated in FIG. 2 that is closed both on the anode side and on the cathode side is to be operated as a system that is closed on the anode side but open on the cathode side, a possibility for separating the cathode operating gas flow path 12 from the cathode exhaust gas flow path 14 must be provided between the cathode operating gas flow path 12 and the cathode exhaust gas flow path 14. i.e. between the water separator 16 and the venturi nozzle 17. This may, for example, be carried out by means of a simple stop valve, such as valves 5 or 55. The valve 5 for draining gas from the cathode gas circuit 11 may be replaced by means 5' from FIG. 3, or such means 5' may be additionally provided in the cathode exhaust gas discharge path. By means of a junction in the oxygen flow path 31 between the pressure reducer 33 and the 3-2-way valve 32, the oxygen source 30 may be decoupled and replaced by an air source 30'. The fuel cell system illustrated in FIG. 2 is then ready for operation as a system that is only closed on the anode side. Analogously, a system that is closed on the cathode side, but open on the anode side, may be achieved by modification on the anode side.

The invention claimed is:

1. A fuel cell system suitable for operation with a cathode operating gas containing oxygen and inert gas and an anode operating gas containing hydrogen and inert gas, comprising:
    a fuel cell arrangement having at least one fuel cell,
        wherein the fuel cell comprises a cathode having a cathode flow region and an anode having an anode flow region;
    an oxygen source, a hydrogen source and an inert gas source;
    a cathode gas circuit comprising
        a cathode operating gas flow path for feeding the cathode operating gas into the cathode flow region of the cathode,
        the cathode flow region,
        a cathode exhaust gas flow path for receiving cathode exhaust gas from the cathode flow region and for recirculating the cathode exhaust gas into the cathode operating gas flow path, and
        a transition point where the cathode exhaust gas flow path transitions into the cathode operating gas flow path;
    an anode gas circuit comprising
        an anode operating gas flow path for feeding the anode operating gas into the anode flow region of the anode,
        the anode flow region,
        an anode exhaust gas flow path for receiving anode exhaust gas from the anode flow region and for recirculating the anode exhaust gas into the anode operating gas flow path, and
        a transition point where the anode exhaust gas flow path transitions into the anode operating gas flow path;
    means for separating liquid water from the cathode exhaust gas in the cathode exhaust gas flow path and means for separating liquid water from the anode exhaust gas in the anode exhaust gas flow path;
    means for generating a flow in the cathode gas circuit and means for generating a flow in the anode gas circuit, wherein one or more of the means for generating a flow in the cathode gas circuit and the means for generating a flow in the anode gas circuit are a pump or a jet nozzle;
    a pressure sensor in the cathode gas circuit, a pressure sensor in the anode gas circuit, a temperature sensor in the cathode gas circuit and optionally a temperature sensor in the anode gas circuit for determining an actual amount of a gas in the cathode gas circuit and for determining an actual amount of gas in the anode gas circuit;

an inert gas flow path leading from the inert gas source to the transition point in the cathode gas circuit or to a point upstream of the transition point of the cathode gas circuit, and an inert gas flow path leading from the inert gas source to the transition point in the anode gas circuit or to a point upstream of the transition point of the anode gas circuit;

an oxygen flow path leading from the oxygen source to the transition point in the cathode gas circuit and a hydrogen flow path leading from the hydrogen source to the transition point in the anode gas circuit;

means for supplying inert gas to the cathode gas circuit and to the anode gas circuit until a nominal amount of inert gas is reached in the cathode gas circuit and the anode gas circuit;

means for supplying oxygen to the cathode gas circuit until a nominal amount of oxygen is reached in the cathode gas circuit;

means for supplying hydrogen to the anode gas circuit until a nominal amount of hydrogen is reached in the anode gas circuit;

means for generating a vacuum in the cathode gas circuit; and means for generating a vacuum in the anode gas circuit;

wherein said cathode gas circuit and said anode gas circuit are configured to be under atmospheric pressure before initiation of operation of said fuel cell arrangement, and wherein said means for generating a vacuum in the cathode gas circuit and said means for generating a vacuum in the anode gas circuit are configured to be used before said initiation of operation of said fuel cell arrangement;

wherein said means for generating a vacuum in the cathode gas circuit and said means for generating a vacuum in the anode gas circuit are further configured to allow a reduction of inert gas partial pressure in said cathode gas circuit and said anode gas circuit, respectively, before said initiation of operation of the fuel cell arrangement, when said fuel cell system is configured to operate at said inert gas partial pressure below said atmospheric pressure; and, wherein the fuel cell system is configured to
not receive matter from an environment during operation of the at least one fuel cell, and
not release matter into the environment, and
not store fuel cell exhaust gas, and
store water in liquid form.

2. The fuel cell system according to claim 1, further comprising means for feeding either oxygen from the oxygen flow path or inert gas from the inert gas flow path into the cathode gas circuit at the transition point of the cathode gas circuit and/or means for feeding either hydrogen from the hydrogen flow path or inert gas from the inert gas flow path into the anode gas circuit at the transition point of the anode gas circuit.

3. The fuel cell system according to claim 1, in which one or more of
the means for supplying inert gas to the cathode gas circuit and to the anode gas circuit is a pressure reducer in the inert gas flow path,
the means for supplying oxygen to the cathode gas circuit is a pressure reducer in the oxygen flow path,
the means for supplying hydrogen to the anode gas circuit is a pressure reducer in the hydrogen flow path.

4. The fuel cell system according to claim 1, further comprising at least one container for storing said water in liquid form, the container being in fluid connection with the means for separating liquid water from the cathode exhaust gas and/or with the means for separating liquid water from the anode exhaust gas, via a water pump.

5. The fuel cell system according to claim 1, further comprising means for discharging gas from the cathode exhaust gas flow path and/or means for discharging gas from the anode exhaust gas flow path.

6. The fuel cell system according to claim 1, wherein said fuel cell system is coupled with a manned or unmanned submarine vehicle.

7. A fuel cell system suitable for operation with air as a cathode operating gas and an anode operating gas containing hydrogen and nitrogen, comprising:
a fuel cell arrangement having at least one fuel cell,
wherein the fuel cell comprises a cathode having a cathode flow region and an anode having an anode flow region;
an oxygen source, a hydrogen source, and a nitrogen source;
a cathode gas flow path comprising
a cathode operating gas flow path for feeding the cathode operating gas into the cathode flow region of the cathode,
the cathode flow region, and
a cathode exhaust gas flow path for receiving cathode exhaust gas from the cathode flow region;
an anode gas circuit comprising
an anode operating gas flow path for feeding the anode operating gas into the anode flow region of the anode,
the anode flow region,
an anode exhaust gas flow path for receiving anode exhaust gas from the anode flow region and for recirculating the anode exhaust gas into the anode operating gas flow path, and
a transition point where the anode exhaust gas flow path transitions into the anode operating gas flow path;
means for separating liquid water from the anode exhaust gas in the anode exhaust gas flow path;
means for generating a flow in the anode gas circuit, wherein the means for generating a flow in the anode gas circuit is a pump or a jet nozzle;
a pressure sensor in the cathode gas flow path, a pressure sensor in the anode gas circuit, a temperature sensor in the cathode gas flow path and optionally a temperature sensor in the anode gas circuit for determining an actual amount of a gas in the cathode gas flow path and for determining an actual amount of a gas in the anode gas circuit;
a nitrogen flow path from the nitrogen source to the transition point in the anode gas circuit or to a point upstream of the transition point in the anode gas circuit;
a hydrogen flow path leading from the hydrogen source to the transition point in anode gas circuit;
means for supplying nitrogen to the anode gas circuit until a nominal amount of nitrogen is reached in the anode gas circuit;
means for supplying hydrogen to the anode gas circuit until a nominal amount of hydrogen is reached in the anode gas circuit;
a valve in the cathode exhaust gas flow path; and
means for generating a vacuum in the anode gas circuit;
wherein said anode gas circuit is configured to be under atmospheric pressure before initiation of operation of said fuel cell arrangement, and wherein said means for generating a vacuum in the anode gas circuit is configured to be used before said initiation of operation of said fuel cell arrangement;

wherein said means for generating a vacuum in the anode gas circuit is further configured to allow a reduction of inert gas partial pressure in said anode gas circuit, before said initiation of operation of the fuel cell arrangement, when said fuel cell system is configured to operate at said inert gas partial pressure below said atmospheric pressure; and, wherein the fuel cell system is configured to
not receive anode operating gas from an environment during operation of the at least one fuel cell, and
not release anode exhaust gas into the environment, and
not store anode exhaust gas, and
store water in liquid form.

8. The fuel cell system comprising a fuel cell system according to claim 7, wherein said fuel cell system is coupled with a manned or unmanned submarine vehicle.

9. A method for operating a fuel cell system with a cathode operating gas containing oxygen and inert gas and an anode operating gas containing hydrogen and inert gas, the fuel cell system comprising:
a fuel cell arrangement having at least one fuel cell,
wherein the fuel cell comprises a cathode having a cathode flow region and an anode having an anode flow region;
a cathode gas circuit comprising
a cathode operating gas flow path,
the cathode flow region,
a cathode exhaust gas flow path, and
a transition point where the cathode exhaust gas flow path transitions into the cathode operating gas flow path; and
an anode gas circuit comprising
an anode operating gas flow path,
the anode flow region,
the anode exhaust gas flow path, and
a transition point where the anode exhaust gas flow path transitions into the anode operating gas flow path,
the method comprising the following steps:
generating a vacuum in the anode gas circuit to allow a reduction of inert gas partial pressure in said anode gas circuit, before initiating operation of the fuel cell arrangement, when said fuel cell system operates at said inert gas partial pressure below said atmospheric pressure; and,
configuring said anode gas circuit to be under atmospheric pressure before initiating operation of said fuel cell arrangement;
feeding a cathode operating gas containing oxygen and inert gas into the cathode flow region of the fuel cell and feeding an anode operating gas containing hydrogen and inert gas into the anode flow region of the fuel cell, wherein an oxygen concentration in the cathode operating gas has a predetermined nominal value and a hydrogen concentration in the anode operating gas has a predetermined nominal value;
having oxygen and hydrogen react in the fuel cell, thereby generating
electrical energy,
a cathode exhaust gas containing inert gas and water, and
an anode exhaust gas containing inert gas and water;
separating liquid water from the cathode exhaust gas and from the anode exhaust gas, thereby generating a cathode exhaust gas free of liquid water and an anode exhaust gas free of liquid water;
feeding the entire cathode exhaust gas free of liquid water into the cathode operating gas flow path and feeding the entire anode exhaust gas free of liquid water into the anode operating gas flow path;
determining an actual value of the oxygen concentration of the gas in the cathode operating gas flow path and determining an actual value of the hydrogen concentration of the gas in the anode operating gas flow path;
feeding oxygen into the cathode operating gas flow path until the predetermined nominal value of the oxygen concentration of the cathode operating gas is reached, and feeding hydrogen into the anode operating gas flow path until the predetermined nominal value of the hydrogen concentration of the anode operating gas is reached; and
maintaining a gas flow rate in the cathode gas circuit and the anode gas circuit while:
not receiving anode operating gas from an environment during operation of the fuel cell arrangement, and
not releasing anode exhaust gas into the environment, and
not storing anode exhaust gas, and
storing water in liquid form.

10. The method according to claim 9, in which, before taking the fuel cell arrangement into operation, the following steps are performed:
filling the cathode gas circuit and the anode gas circuit by evacuation and/or feeding in inert gas, each substantially simultaneously, with such an amount of inert gas that
when feeding oxygen into the cathode operating gas flow path under operating conditions of the fuel cell system, a cathode operating gas with the predetermined nominal value of the oxygen concentration is formed, and
when feeding hydrogen into the anode operating gas flow path under the operating conditions of the fuel cell system, an anode operating gas with the predetermined nominal value of the hydrogen concentration is formed;
setting the operating conditions of the fuel cell system;
feeding oxygen into the cathode operating gas flow path until the predetermined nominal value of the oxygen concentration of the cathode operating gas is reached, and substantially simultaneously;
feeding hydrogen into the anode operating gas flow path until the predetermined nominal value of the hydrogen concentration of the anode operating gas is reached.

11. The method according to claim 9, in which the oxygen concentration in the cathode operating gas flow path and the hydrogen concentration in the anode operating gas flow path are determined regularly or continuously.

12. The method according to claim 9, in which nitrogen is used as inert gas.

13. The method according to claim 9, wherein the method further comprises coupling said fuel cell system with a manned or unmanned submarine vehicle.

14. A method for operating a fuel cell system with air as a cathode operating gas and an anode operating gas containing hydrogen and nitrogen, wherein the fuel cell system comprises:

a fuel cell arrangement having at least one fuel cell, wherein the at least one fuel cell comprises a cathode having a cathode flow region and an anode having an anode flow region;

a cathode gas flow path comprising
    a cathode operating gas flow path,
    the cathode flow region, and
    a cathode exhaust gas flow path; and an anode gas circuit comprising
    an anode operating gas flow path,
    the anode flow region,
    an anode exhaust gas flow path, and
    a transition point where the anode exhaust gas flow path transitions into the anode operating gas flow path;

the method comprising the following steps:
    generating a vacuum in the anode gas circuit to allow a reduction of inert gas partial pressure in said anode gas circuit, before initiating operation of the fuel cell arrangement, when said fuel cell system operates at said inert gas partial pressure below said atmospheric pressure; and,
    configuring said anode gas circuit to be under atmospheric pressure before said initiating operation of said fuel cell arrangement;
    feeding air as cathode operating gas into the cathode flow region of the fuel cell, wherein the air has an oxygen concentration, and feeding an anode operating gas containing hydrogen and nitrogen into the anode flow region of the fuel cell, wherein a hydrogen concentration in the anode operating gas has a predetermined nominal value corresponding to the oxygen concentration in the air;
    having oxygen and hydrogen react in the fuel cell, thereby generating
        electrical energy,
        a cathode exhaust gas containing nitrogen and water, and
        an anode exhaust gas containing nitrogen and water;
    separating liquid water from the anode exhaust gas, thereby generating an anode exhaust gas free of liquid water;
    feeding the entire anode exhaust gas free of liquid water into the anode operating gas flow path;
    determining an actual value of the hydrogen concentration of the gas in the anode operating gas flow path;
    optionally determining the oxygen concentration of the air in the cathode operating gas flow path;
    feeding hydrogen into the anode operating gas flow path until the predetermined nominal value of the hydrogen concentration of the anode operating gas is reached;
    maintaining a gas flow rate in the anode gas circuit and the cathode gas flow path; and
    discharging the cathode exhaust gas from the cathode exhaust gas flow path while:
        not receiving anode operating gas from an environment during operation of the fuel cell arrangement, and
        not releasing anode exhaust gas into the environment, and
        not storing anode exhaust gas, and
        storing water in liquid form.

15. The method according to claim 14, in which, before taking the fuel cell arrangement into operation, the following steps are performed:
    feeding air into the cathode gas flow path and substantially simultaneously filling the anode gas circuit by evacuation and/or feeding in nitrogen, with such an amount of nitrogen that when feeding hydrogen into the anode operating gas flow path under operating conditions of the fuel cell system, an anode operating gas with the predetermined nominal value of the oxygen concentration is generated, said nominal value corresponding to the oxygen concentration in the air;
    setting the operating conditions of the fuel cell system;
    feeding hydrogen into the anode operating gas flow path until the predetermined nominal value of the hydrogen concentration of the anode operating gas is reached.

16. The method according to claim 14, in which the hydrogen concentration in the anode operating gas flow path and, optionally, the oxygen concentration in the cathode operating gas flow path are determined regularly or continuously.

17. The method according to claim 14, wherein the method further comprises coupling said fuel cell system with a manned or unmanned submarine vehicle.

\* \* \* \* \*